United States Patent [19]

Vranish

[11] Patent Number: 5,219,318
[45] Date of Patent: Jun. 15, 1993

[54] SPLINE SCREW AUTOCHANGER

[75] Inventor: John M. Vranish, Crofton, Md.

[73] Assignee: The United States of America as represented by the Administrator of the National Aeronautics & Space Administration, Washington, D.C.

[21] Appl. No.: 918,746

[22] Filed: Jul. 27, 1992

[51] Int. Cl.$^5$ .................. B23Q 3/155; B25J 15/04
[52] U.S. Cl. .................................... 483/16; 414/729; 483/901; 901/30; 901/41
[58] Field of Search .............. 483/16, 2, 13, 54, 69, 483/55, 27, 901, 902; 901/30, 31, 50, 41; 414/729, 738; 294/86.4

[56] References Cited

U.S. PATENT DOCUMENTS

| | | | |
|---|---|---|---|
| 4,249,426 | 2/1981 | Erikson et al. | 74/441 |
| 4,474,515 | 8/1984 | Pitzer | 411/16 |
| 4,846,614 | 7/1989 | Steinbock | 411/307 |
| 4,875,266 | 8/1989 | Batten | 29/263 |
| 4,913,617 | 4/1990 | Nicholson | 483/16 |
| 4,980,963 | 1/1991 | Dinse | 483/69 |
| 4,990,044 | 2/1991 | Kimak | 411/427 |
| 5,044,063 | 9/1991 | Voellmer | 483/901 X |

FOREIGN PATENT DOCUMENTS 1468746 3/1989 U.S.S.R. ................ 901/30
2191466 12/1987 United Kingdom ........ 901/50

*Primary Examiner*—William Briggs
*Attorney, Agent, or Firm*—Paul S. Clohan, Jr.; R. Dennis Marchant; Guy M. Miller

[57] ABSTRACT

A captured nut member is located within a tool interface assembly and being actuated by a spline screw member driven by a robot end effector. The nut member lowers and rises depending upon the directional rotation of the coupling assembly. The captured nut member further includes two winged segments which project outwardly in diametrically opposite directions so as to engage and disengage a clamping surface in the form of a chamfered notch respectively provided on the upper surface of a pair of parallel forwardly extending arm members of a bifurcated tool stowage holster which is adapted to hold and store a robotic tool including its end effector interface when not in use. A forward and backward motion of the robot end effector operates to insert and remove the tool from the holster.

14 Claims, 3 Drawing Sheets

SPLINE SCREW AUTOCHANGER

ORIGIN OF THE INVENTION

This invention was made by an employee of the United States Government and may be used by or for the Government for governmental purposes without the payment of any royalties thereon or therefor.

CROSS REFERENCE TO RELATED APPLICATIONS

This invention is related to inventions shown and described in the following U.S. patent applications:

(a) U.S. Ser. No. 07/710,633, "Spline-Locking Payload Fastener", John M. Vranish, Jun. 5, 1991; (b) U.S. Ser. No. 07/824,126, "Work Attachment Mechanism/Work Attachment Fixture", John M. Vranish, Jan. 22, 1992, now U.S. Pat. No. 5,174,772; and (c) U.S. Ser. No. 07/918,747, "Split Spline Screw", John M. Vranish, Jul. 27, 1992.

These inventions and applications, moreover, are assigned to the assignee of the present invention. Furthermore, the teachings of these related applications are herein meant to be incorporated by reference.

BACKGROUND OF THE INVENTION

This invention relates generally to robotic systems and more particularly to a tool autochanger which permits automatic exchange of its end of arm tooling apparatus.

DESCRIPTION OF THE PRIOR ART

Robotic tool changers are generally known and generally fall into two classes, active and passive. An active type of tool changing system typically uses mechanical or electrical actuators to make or break the connection between the two halves of the tool changer at the wrist joint. A passive system, on the other hand, typically uses the robot's wrist motion to actuate an engagement mechanism. Where the robot is intended to be used in zero gravity environments, such as outer space, tool changers which include mechanical actuators are generally unacceptable. Tool changers having electrical actuators normally become unacceptable because large redundant power trains and motors utilized result in an unwieldy system.

One known passive type tool changer system includes, among other things, a wrist interface plate which is secured to the wrist joint of a robotic arm, a tool interface plate which is secured to each tool which is intended for use by the robotic arm, and a tool stowage assembly or holster for one or more tool and interface plates and which is intended to lock the tool(s) down when not in use.

Although these tool change mechanisms operate as intended, the latter system includes a limitation in that it relies on the robot to provide the insertion force to blind mate electrical connectors and the protective apparatus associated therewith.

SUMMARY

Accordingly, it is an object of the invention to provide an improvement in robotic tool changer mechanisms.

It is another object of the invention to provide an improvement in active type tool changer mechanisms.

It is a further object of the invention to provide a tool changer which is operable in zero gravity environments.

And it is still another object of the invention to provide a tool changer which is designed so that it does not constrain the size and shape of the tool with which it is used.

Briefly, the foregoing and other objects of the invention are obtained by a captured nut member located in a tool interface assembly actuated by a spline screw coupling means driven by a robot end effector, and which lowers and rises depending upon the directional rotation of the coupling means. The captured nut member includes two winged segments which project outwardly in diametrically opposite directions so as to engage and disengage a clamping surface in the form of a chamfered notch respectively provided on the upper surface of a pair of parallel forwardly extending arm members of a bifurcated tool stowage assembly comprising a holster which is adapted to hold and store a robotic tool including its end effector interface when not in use. A forward and backward motion of the robot end effector operates to insert and remove the tool from the holster.

BRIEF DESCRIPTION OF THE DRAWINGS

The following detailed description of the invention will be more readily understood when considered in conjunction with the accompanying drawings in which.

DETAILED DESCRIPTION OF THE INVENTION

Figure 1:
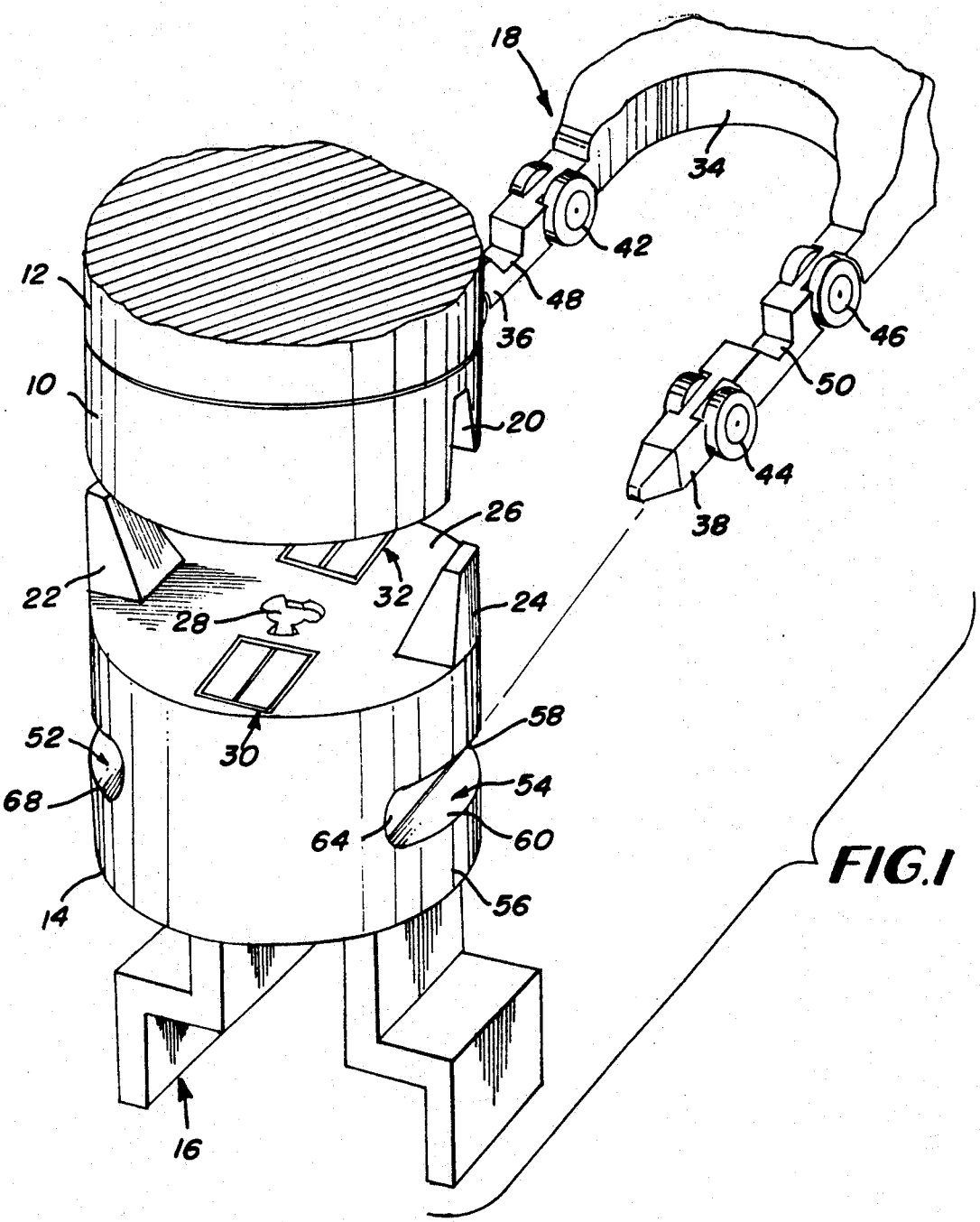
FIG. 1 is a perspective view of a robot end effector, an end effector tool interface including an autochanger mechanism therein, and an empty holster for receiving the tool interface.

Referring now to the drawings wherein like reference numerals refer to like parts throughout, reference is first made to FIG. 1 where there is disclosed the three main components of the invention and which comprises: a standard robotic end effector 10 secured to the outer end of a robot arm 12, an end effector tool interface assembly 14 attached to a robotic tool shown by reference numeral 16, and a tool stowage assembly or holster 18 to which the tool interface assembly 14 can be attached. The end effector 10 includes a male spline member, not shown in FIG. 1 but which is shown in FIG. 2 by reference numeral 96, along with a pair of alignment recesses, one of which is shown by reference numeral 20, and which are adapted to engage a pair of upwardly extending mating blocks 22 and 24 on the upper surface 26 of the tool interface 14.

Figure 2:
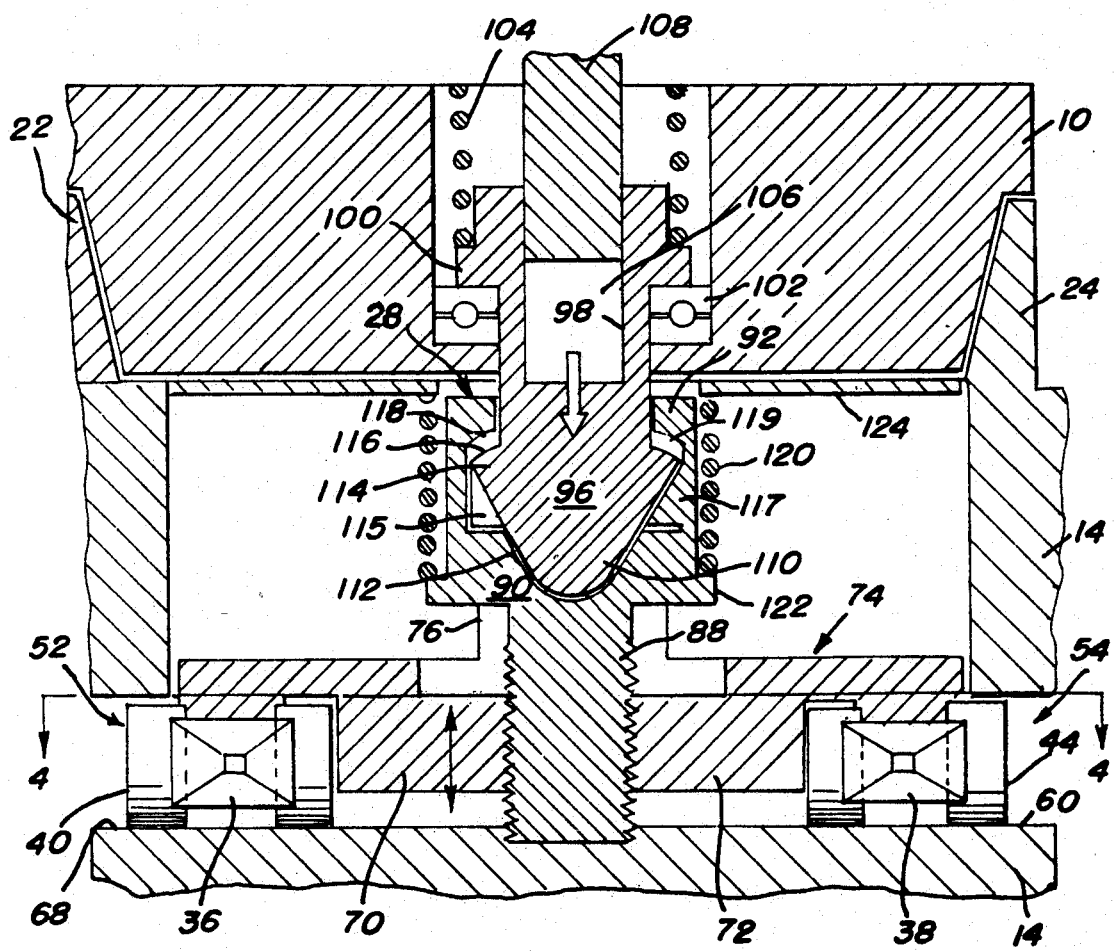
FIG. 2 is a central vertical cross section of the elements shown in Figure depicting the preferred embodiment of the invention.

The surface 26 also includes a centralized female spline assembly 28, the details of which are also shown in FIG. 2. Whereas the mating blocks 22 and 24 are located on one diameter of the surface 26, which is circular in shape, a pair of dust cover assemblies 30 and 32 are located on a transverse diameter therebetween. The dust covers 30 and 32 have for their function the protection of respective electrical connector elements, not shown, located within the body of the tool interface assembly 14 and which are adapted to mate with complementary electrical connectors, also not shown, located in the body of the end effector 10.

The holster 18 is shown comprised of a bifurcated structure including a yoke 34 from which projects a pair of outwardly extending wheeled arm members 36 and 38, each having forward and rear pairs of wheels 40, 42 and 44, 46, three of which are shown in FIG. 1. Between the pair of wheels 40 and 42 on the right arm member 36, is a chamfered notch 48. Likewise, between the pairs of wheels 44 and 46 on the left arm member 38 is an identical chamfered notch 50. The purpose of the sets of wheels 40, 42 and 44, 46 is to provide low friction engagement with a pair of holster guides 52 and 54 formed in the round outer side wall 56 of the tool interface plate assembly 14.

Figure 3:
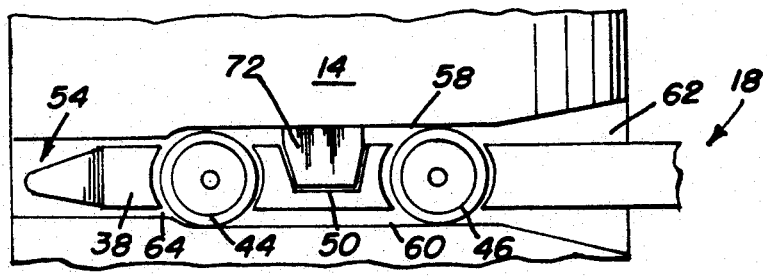
FIG. 3 is a partial side elevational view illustrating one of the forwardly extending arm members of the holster shown in position on the end effector tool interface as shown in FIG. 1.

As shown in FIG. 3, the holster guide 54, the opposite holster guide 52 being of identical construction, includes a lower wheel contact surface 60 and including a flared opening 62 and an opposite end 64 of reduced size which acts as a stop for the front wheels 44. Reference numeral 68 indicates the lower wheel contact surface of the holster guide 52.

Figure 4:
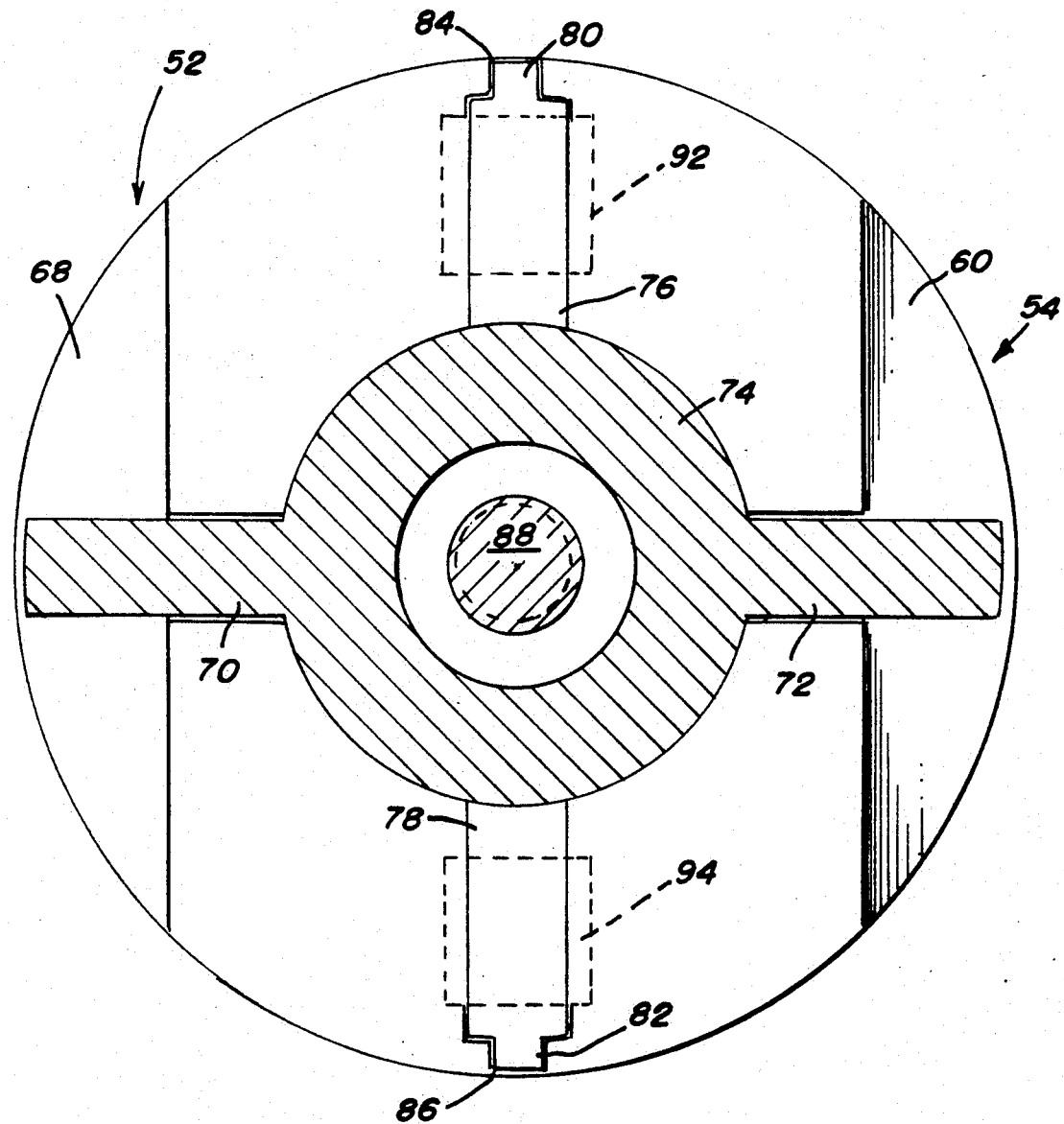
FIG. 4 is a top planar sectional view taken along the lines 4—4 of FIG. 2.

Referring now collectively to FIGS. 2 and 3, the end effector 10 and the interface plate assembly 14 are shown in FIG. 2 in mutual contact with each other and the arm members 36 and 38 are in place in the holster guides 52 and 54 indicating that the end effector 10 has moved the tool interface plate assembly 14 into a parked position on the holster 18 where it is stowed while being held in place by two outwardly extending wing segments 70 and 72 of an autochange clamping element consisting of a captured nut 74 and which engage and disengage the notches 48 and 50 of the holster arm members 36 and 38. Further as shown in FIG. 4, the captured nut 74 additionally includes a second pair of outwardly extending wing segments 76 and 78 which include outer end portions 80 and 82 which reside in respective channels 84 and 86 and which constrain the nut 74 to translate vertically when driven by the threaded shank 88 of a female spline member 90 which also includes a hollow bolt section 92 (FIG. 2). The wing segments 76 and 78 of the captured nut 74 are orthogonally located with respect to the wing segments 70 and 72 and are designed to carry a pair of electrical connectors 92 and 94, shown in phantom, which when driven upward by the operation of the spline member 90, project through the dust covers 30 and 32 shown in FIG. 1 to couple to complementary electrical connectors, not shown, located in the end effector 10.

Considered now will be the mechanism for operating the captured nut 74 which when translated in one direction causes the tool interface plate assembly 14 to be clamped to the holster arms 36 and 38 while in the other direction causes electrical connections to be made between the end effector 10 and the interface plate assembly 14.

As further shown in FIG. 2, a male spline member 96 of the type shown and described in the above-referenced related application, U.S. Ser. No. 07/918,747 entitled, "Split Spline Screw", engages the female type spline member 90 via the hollow bolt section 92. The male spline member 96 includes a hollow shank 98 which includes a shoulder 100 which abuts a thrust bearing 102 and a compliance spring 104. The shank 98 includes an axial bore 106 which is adapted to receive a spline shaft 108 of a drive motor, not shown, located in the robotic arm 12 (FIG. 1). The male spline 96 further includes an alignment cone 110 at the bottom which is adapted to seat in a conical recess 112 located in the cavity of the female spline bolt head 92. The male spline 96 also includes, among other things, a plurality of spline sections 114, typically three in number, having a convex upper load bearing surface 116 which matches a concave undersurface 118 at the top of the bolt head 92. When the end effector 10 and the tool interface assembly 14 are in position as shown in FIG. 2, the spring loaded male spline 96 can enter the cavity of the female spline bolt head 92 to establish a soft dock condition.

Further as shown in FIG. 2, the female spline bolt head 92 is surrounded by compression spring 120 which seats against a shoulder section 122 and the top undersurface 124 of the interface assembly 14. When the male spline 96 is in a soft dock condition and is thereafter driven and rotated clockwise, for example, a vertical spline section 115 of the male spline 96 contacts an inwardly projecting tab portion 117 inside of the female spline bolt head 92 and the two members 90 and 96 rotate together. Since the nut member 74 cannot rotate, it initially remains in place while the female spline 90 translates downward until the gap 119 between the spline surfaces 116 and 118 closes and elements 90 and 96 are spline-locked. At that point the spline 90 can no longer translate downwardly. Accordingly, the nut 74 begins to travel upwardly along the thread of the bolt shank 88.

Such an operation would be employed to unclamp the tool interface assembly 14 from the holster 18 for removal. A continued upward travel of the captured nut 74, as was indicated above, causes electrical connectors in the interface assembly 14 and the end effector 10 to make contact so that tool operation can commence by virtue of its being coupled to the robotic arm 12. Alternatively, when a tool stowage or parking operation is required, the opposite sequence of events is produced to drive the captured nut 74 downward as shown in FIG. 2, where it clamps onto the outward extending holster arms 36 and 38.

The mechanism thus described while being an active system, is relatively simple in design and can readily be integrated into the structure shown and disclosed in related application U.S. Ser. No. 07/918,747. The tool change mechanism in accordance with this invention, moreover, performs a secure hand-off of the tool from the holster to the arm and back again and can do so at any orientation and in zero gravity environments. It should also be noted that due to the sideways motion of the tool hand-off from the end effector to the holster, the size and shape of the tool is not constrained and no part of the holster protrudes up or down from the tool changer itself, leaving the space free for use in connection with large tools.

Having thus shown and described what is at present considered to be the preferred embodiment of the invention, it should be noted that the same has been made by way of illustration and not limitation. Accordingly, all modifications, alterations and changes coming within the spirit and scope of the invention as encompassed in the appended claims are meant to be included.

I claim:

1. Tool changer apparatus for a robotic system comprising:

first interface means for attachment to a robotic arm;

second interface means for attachment to a robotic too;

stowage means for receiving and holding said second interface means including said tool when not in use;

said first and second interface means further comprising respective mechanical coupling means for becoming mutually interlocked during use and also during movement to and from said stowage means and including means responsive to the operation of said coupling means for clamping to said stowage means following movement thereto and unclamping from said stowage means prior to movement therefrom;

said mechanical coupling means comprises spline means driven by said robotic arm.

2. The tool changer apparatus of claim 1 wherein said first interface means comprises an end effector and wherein said mechanical coupling means thereof includes a male spline member.

3. The tool changer apparatus of claim 2 wherein said second interface means comprises a tool interface assembly and wherein said mechanical coupling means thereof includes a female spline member.

4. The tool changer apparatus of claim 3 wherein said female spline member includes a threaded shank and wherein said means for clamping comprises a captured nut constrained to translate up and down said threaded shank without rotating, said captured nut further including a portion thereof for contacting said stowage means.

5. The tool changer apparatus of claim 4 wherein said stowage means comprises a bifurcated holster including a pair of outwardly extending arm members engageable with said tool interface assembly.

6. The tool changer apparatus of claim 5 wherein said arm members each include a clamping notch for receiving said portion of said captured nut.

7. The tool changer apparatus of claim 6 wherein said portion of said captured nut comprises a pair of nut wing segments extending outwardly from a nut body located on said threaded shank.

8. The tool changer apparatus of claim 6 and wherein said tool interface assembly includes a round outer side wall and having a pair of holster guides formed therein adjacent said nut wing segments of said captured nut for engaging said arm members of said holster.

9. The tool changer apparatus of claim 8 wherein each arm member includes at least one wheel secured thereto for contact with a respective holster guide of said pair.

10. The tool changer apparatus of claim wherein each holster guide includes a pair of opposing wheel contact surfaces having a flared input end section for receiving a forward end of a respective arm member and an opposite end section of reduced size for acting as a stop for said arm member.

11. The tool changer apparatus of claim 8 and wherein each arm member includes wheeled holster guide contact members fore and aft of its respective clamping notch.

12. The tool changer apparatus of claim 7 and additionally including a second pair of outwardly extending wing segments on said nut body for holding electrical connector means which are translated upwards for connection to complementary electrical connector means in said end effector.

13. The tool changer apparatus of claim 12 wherein said second pair of wing segments are oriented transversely of the first recited pair of wing segments.

14. The tool changer apparatus of claim 13 wherein said tool interface assembly includes dust cover means on a surface facing said end effector for protecting said electrical connector means.

* * * * *